Jan. 12, 1937.  A. PACHTA  2,067,618
CLAMPING DEVICE
Filed March 26, 1935  5 Sheets-Sheet 1

Inventor:
ALFONS PACHTA
by Walter S. Bleistein
ATTORNEY.

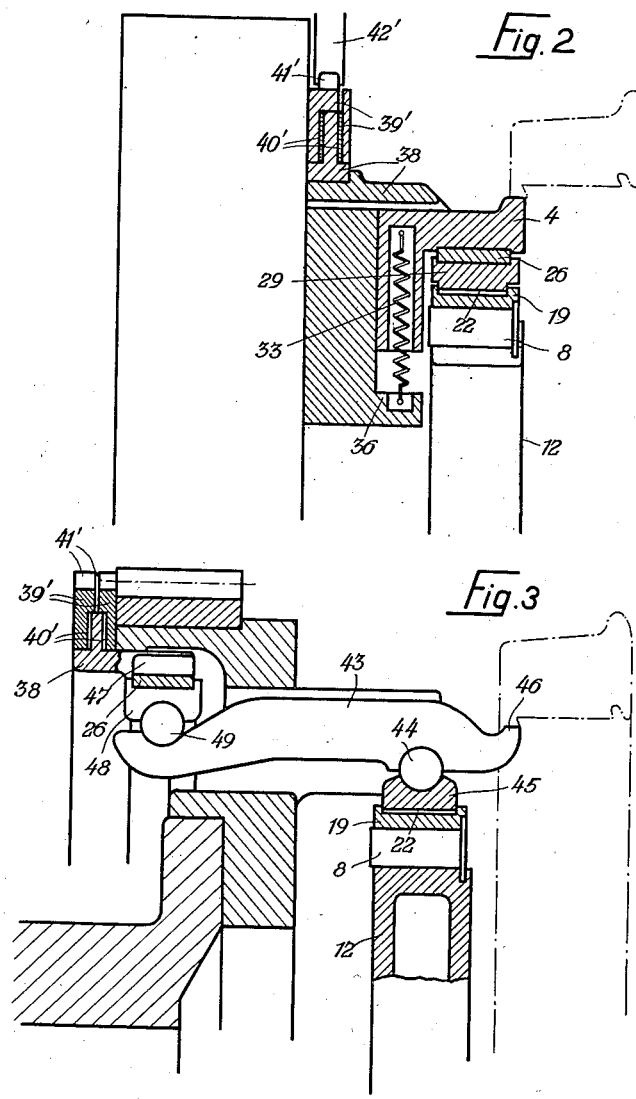

Jan. 12, 1937.  A. PACHTA  2,067,618
CLAMPING DEVICE
Filed March 26, 1935  5 Sheets-Sheet 3
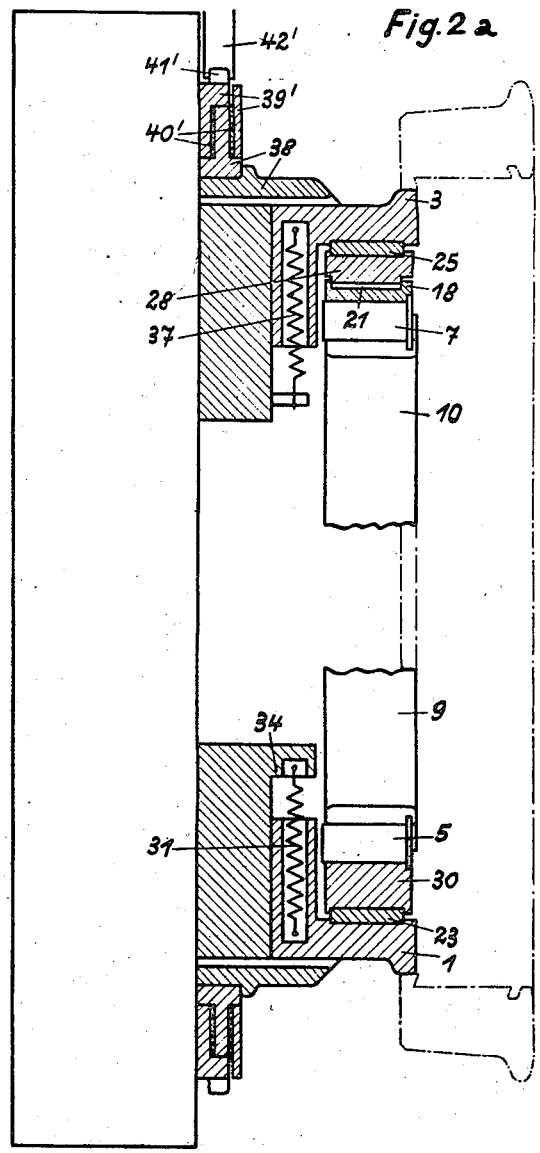
INVENTOR
ALFONS PACHTA
BY
Walter S. Bleistein
ATTORNEY

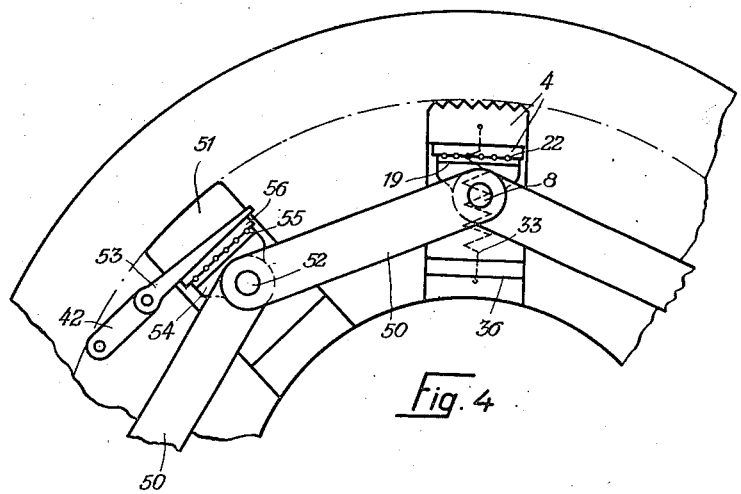

Jan. 12, 1937.   A. PACHTA   2,067,618
CLAMPING DEVICE
Filed March 26, 1935   5 Sheets-Sheet 5

Inventor:
ALFONS PACHTA
by Walter S. Bleistein
ATTORNEY

Patented Jan. 12, 1937

2,067,618

UNITED STATES PATENT OFFICE 2,067,618

CLAMPING DEVICE

Alfons Pachta, Ratiborhammer, Germany, assignor to Wilhelm Hegenscheidt A. G., Ratibor, Germany Application March 26, 1935, Serial No. 13,109
In Germany March 29, 1934

22 Claims. (Cl. 82—40)

This invention relates to a device for automatically equalizing the tightening pressure in semi-automatic gripping devices, chucks and the like.

An object of the invention is to provide means for centering a work-piece such as a wheel, and for holding it in centered position while being worked.

Another object of the invention is to provide a gripping and centering device for a work-piece such as a wheel, by means of which the work-piece may be clamped at several places of its periphery in such a manner, that practically no forces tending to alter its position relatively to the gripping device can occur either during the tightening or during the working.

A further object of the invention is to provide a centering means or the like for the above mentioned purposes in which neither said means nor certain auxiliary means are subjected to unpermissibly high stresses.

The present invention consists in a clamping device having three or more blocks or dogs which indirectly abut against the pivots of a closed triangular, quadrangular or polygonal linkage in such a manner, that the blocks or dogs can move in the diagonal direction of the triangle, polygon or the like or approximately in such direction, and that the pivots can move relatively to the blocks at right angles to the said diagonal direction.

The invention, furthermore, consists in means for yieldingly drawing all the blocks or dogs except one against stops, and the remaining block or dog against its associated pivot which is brought thereby into the position necessary for starting the clamping of a work-piece.

Other objects, features and details of the invention will be apparent from the following description of various embodiments illustrated by way of examples in the accompanying drawings in which:

Figures 2 and 2a are sections on the lines I—I and II—II respectively of Fig. 1;

Figure 3 shows a slightly modified form of construction in a section through one of the pivots similar to the section shown in Figure 2;

Figures 4 to 6 show in plan respectively forms of construction in which bent levers, double bent levers and threaded spindles are employed;

Figure 1:
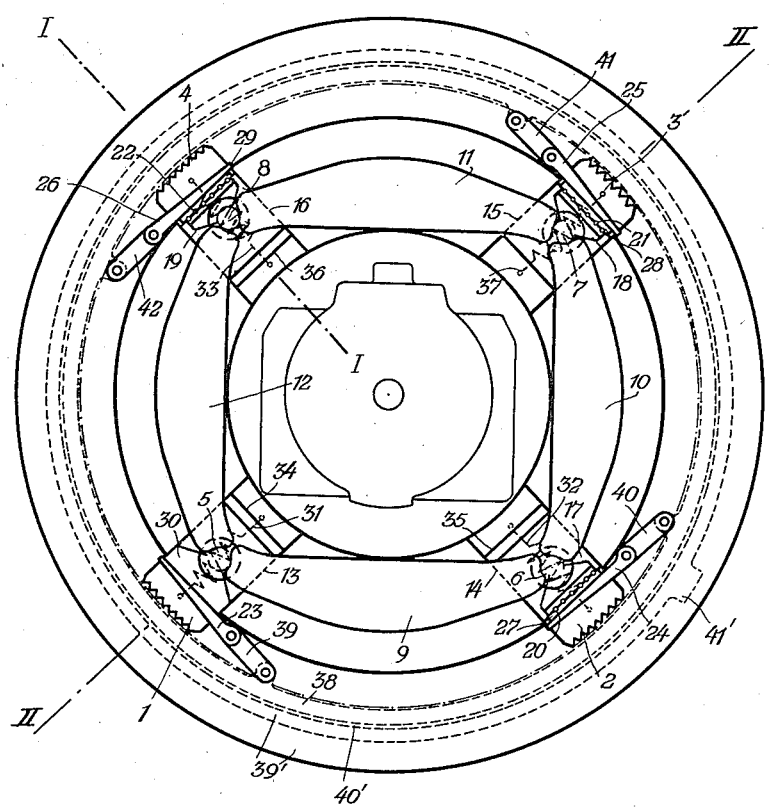
Figure 1 is a plan of the new device having a square linkage.

In the figures the reference numerals 1, 2, 3 and 4 represent the blocks or dogs which abut indirectly against the pivot pins 5, 6, 7 and 8 of the links 9, 10, 11 and 12, which are linked together and form a quadrilateral figure.

The blocks 1, 2, 3 and 4 slide in guides 13, 14, 15 and 16 which run diagonally. The blocks are in the form of angle-shaped pieces, one limb of which slides in the guides 13, 14, 15, 16 while the other limb is provided with teeth and is indirectly supported on the pivot pin. (See Figure 2). Since at least three of the pivot pins must be capable of moving relatively to the blocks at right angles to the diagonal direction of the guides 14 to 16, there are interposed between the pivot pins 6, 7, 8 and the jaws 2, 3, 4 the sliding shoes 17, 18, 19 which are fixed to the pivot pins 6, 7 and 8, respectively in order to reduce friction between the jaws and the shoes, needle or roller bearings 20, 21 and 22 may be arranged on top of the shoes 17, 18, and 19. Hence, the arrangement of block 2 and its accessorial parts (Fig. 2) is the same as that of block 4. The arrangement of both blocks 1 and 3 (Fig. 2a), however differs therefrom mainly inasmuch as block 3 has no stop such as 36 of block 4, and as block 1 has no sliding shoe such as 19.

Means are provided for separating one or several or all of the blocks or dogs from the pertaining pivots in order to clamp the work-piece. In the embodiment illustrated in Fig. 1 the tightening of all the four blocks or edges is effected by means of keys 23, 24, 25 and 26 which are inserted respectively between the blocks 1, 2, 3, 4 and abutment plates 27, 28, 29 and the shoe 30 which is fixed to the pivot pin 5. Both the abutment plates 27, 28, 29, as well as the shoe 30, are likewise guided in the diagonal direction. If for clamping the work-piece not all the blocks or dogs are separated from the pertaining pivots, then the equalization of pressure may not be quite exact, but it will generally be sufficient for practical purposes.

The three blocks 1, 2 and 4 are drawn back inwardly by the springs 31, 32, 33 against stops 34, 35 and 36 into their starting position, while the spring 37 draws back the block 3 until it indirectly abuts against the corresponding pivot pin when the linkage is brought into its starting position by the other blocks striking against their stops.

Preferably, the means for effecting the clamping of the work-piece are so constructed as to permit them to be operated from one place, for example in such a manner that the working movement of the clamping device or chuck is utilized for the clamping. For instance as a common member such as ring 38 may be provided for controlling the keys 23, 24, 25, 26. Since the keys 23—26 must, however, be capable of moving in a radial direction together with the blocks, links 39, 40, 41 and 42 are connected between the keys and the ring 38. The common controlling member or ring 38 may be frictionally engaged with the force necessary for effecting the tightening.

For this purpose and in order to be able to utilize the working movement of the clamping device for clamping and unclamping, there is provided around the ring 38 a second ring 39' which can be adjusted in such a manner, owing to the interposition of the friction linings 40', that, when a tooth 41' on the ring 39' strikes against a stop 42', a torsional force sufficient for effecting the clamping is transmitted to the ring 38. The release of the work-piece can be effected in a similar manner by altering the direction of rotation of the clamping device.

In accordance with my invention, the blocks or dogs may also be in the form of balance levers of which either the fulcrums or the free ends are supported on the linkage. The clamping of the work-piece may then be effected by displacing the free ends of the levers in a direction opposite to that of the clamping movement or by displacing the fulcrum in the same direction. Such a construction is shown in Fig. 3.

The link 12 is again pivoted on the pivot pin 8 which itself rolls on the needle or roller bearing 22 through the agency of the sliding shoe 19. The lever 43 is supported by means of a pivot 44 on a shoe 45 so that the pivot 44 can move in the diagonal direction of the linkage in a similar manner to the plate 29, since the linkage ensures equalization of pressure taking place. In this form of construction the tightening is effected by applying the teeth 46 of the lever 43 to the work-piece by driving the keys 26 between a fixed ring 47 and a shoe 48 by rotating the ring 38. The movement of the shoe 48 is transmitted to the lever 43 through a pin 49.

Instead of separating the blocks or dogs from their associated pivots as shown in the foregoing embodiments, means may be provided for separating the pivots one from another, that is to say, for increasing the size of the linkage in order to cause the clamping effect. For this purpose one, or several or all of the levers forming the linkage may be extensible, and the levers for this purpose may be constructed for example as toggle links or double toggle links or as threaded spindles. In the embodiment of my invention according to Fig. 4, toggle links 50 forming the linkage are provided which are controlled by moving a key 53 between a stop 51 fixed on the clamping device and the pivot pin 52 of the lever 50. The key 53 is moved in a similar manner to the four keys shown in Figure 1. The pivot pin 52 is displaceable through the agency of a sliding shoe 54 and a needle or roller bearing 55 on the abutment plate 56 in a similar manner to the pivot pin 8 in Figure 1.

Figure 5 shows a form of construction in which a double toggle link 57 is employed instead of the elbow lever shown in Figure 4. In this case the pivots 59 and 60 of the levers are moved together by the threaded spindle 58 and the pivots 7 and 8 are thereby separated. If all the levers forming the linkage are constructed in the form of double toggle links, then all the levers can be extended in common, for example by a toothed wheel 61 which engages in a ring of teeth, the centre of which coincides with the centre of the clamping device.

In the construction according to Figure 6 the distance apart of the pivots 7 and 8 is regulated with the aid of threaded spindles 62, 63 and the threaded sleeve 64. The spindles are provided with right-handed and left-handed threads so that, by rotating the sleeve 64, they are screwed out of the sleeve. The simultaneous rotation of all the threaded sleeves can be effected by means of the wheel 65 in a similar manner to the toothed wheel 61 of Figure 5.

Figure 7:
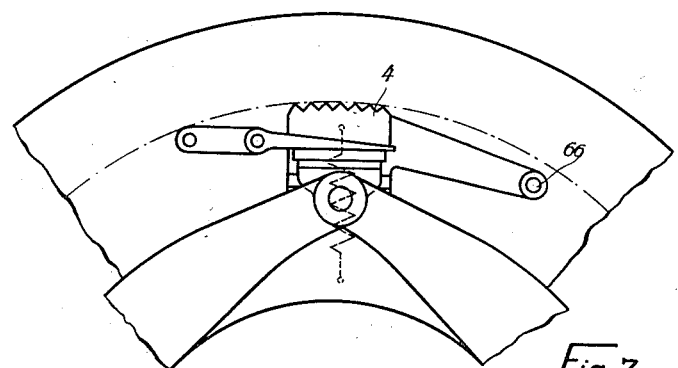
Figure 7 illustrates in plan a form of construction showing one of the blocks or dogs guided in only an approximately diagonal direction.

In the construction according to Figure 7, the block 4 swings about a pivot 66, instead of being guided in a guide 16 as in Figure 1. In this form of construction a movement of the block in only an approximately diagonal direction of the linked polygons is obtained.

Figure 8:
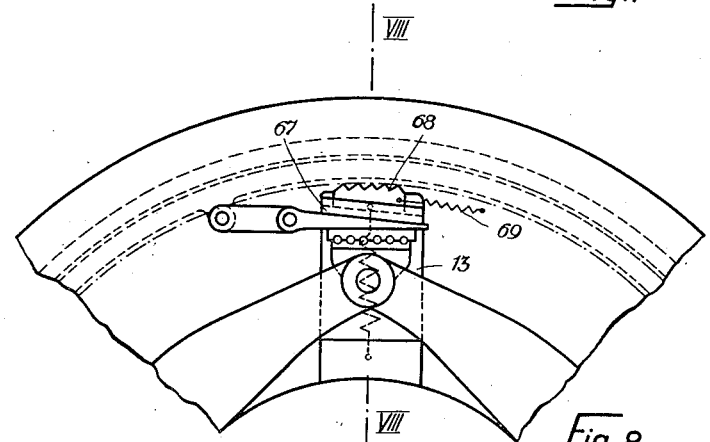
Figure 8 is a plan, and Figure 9 a section on the line VIII—VIII of Figure 8, of a form of construction in which the clamping means in accordance with Figures 1 and 2 effect only a preliminary tightening.
Figure 9:
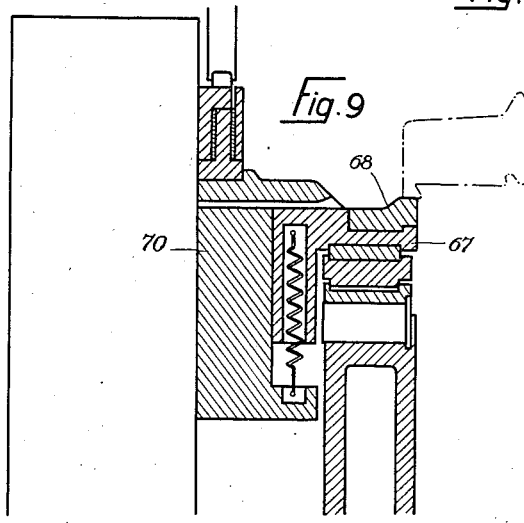

In Figures 8 and 9 the blocks 1 to 4 are similar to those illustrated in Figures 1 and 2 but are of divided construction. The support 67 of the block 68 is in the form of an angle piece, one limb of which slides in the guide 13 in a radial direction. The block 68 is of wedge-like shape and automatically tightens itself as the cutting pressure of the tool increases. The spring 69 is fixed to the ring 70 which receives the guide 13, and its object is to return the block into its lowermost position. The clamping of the work-piece then proceeds in such a manner that the means which are illustrated in Figures 1 and 2 for clamping the work-piece, only effect a preliminary tightening and the final clamping is then effected in known manner by utilizing the resistance to rotation.

The device or chuck according to my invention may be employed in all cases in which a very high degree of accuracy is required. It avoids the drawbacks of other gripping devices as there are neither forces acting upon the means which determine the central position of the work-piece during machining, nor unilateral forces tending to impair the centering of the work-piece, during the tightening.

I claim:—

1. A clamping device whereby a substantial equalization of the pressure exerted by the gripping members is effected, comprising a closed linkage having at least four links pivoted on pivot pins, gripping members adapted to coact with the said pivot pins, means for guiding the gripping members substantially in the directions of the lines bisecting the angles of the linkage, means for enabling at least three of the pivot pins to move substantially at right angles to the directions of movement of said gripping members and means for moving the gripping members in said former directions.

2. A clamping device whereby a substantial equalization of the pressure exerted by the gripping members is effected, comprising a closed linkage having four links of equal length pivoted on pivot pins, gripping members adapted to coact with the said pivot pins, means for guiding the gripping members in the diagonal directions of the linkage, means for enabling three of the pivot pins to move substantially at right angles to said diagonal directions and means for moving the gripping members in said diagonal directions.

3. A clamping device whereby a substantial equalization of the pressure exerted by the gripping members is effected, comprising a closed linkage having at least four links of equal length pivoted on pivot pins, gripping members adapted to coact with the said pivot pins, means for guiding the gripping members substantially in the directions of the lines bisecting the angles of the linkage, shoes connected to at least three of the pivot pins, roller bearings interposed between said shoes and said gripping members for enabling the pins to move transversely to the gripping members and means for moving the gripping members in said former directions.

4. A clamping device whereby a substantial equalization of the pressure exerted by the gripping members is effected, comprising a closed linkage having at least four links of equal length pivoted on pivot pins, gripping members adapted to coact with said pivot pins, means for guiding the gripping members substantially in the directions of the lines bisecting the angles of the linkage, springs attached to said gripping members adapted to draw the gripping members inwards in said guides, stops for arresting the inward movement of at least three of said gripping members, means for enabling at least three of the pivot pins to move substantially at right angles to said former direction of movement and means for moving the gripping members in said former directions.

5. A clamping device whereby a substantial equalization of the pressure exerted by the gripping members is effected, comprising a closed linkage having four equal links pivoted on pivot pins, gripping members adapted to coact with said pivot pins, shoes connected to at least three of the pivot pins, roller bearings interposed between said shoes and said gripping members, means for guiding the gripping members substantially in the directions of the lines bisecting the angles of the linkage, springs attached to said gripping members adapted to draw the gripping members inwards in said guides, stops for arresting the inward movement of at least three of said gripping members, and means for moving the gripping members in said former directions.

6. A clamping device whereby a substantial equalization of the pressure exerted by the gripping members is effected, comprising a closed linkage having at least four links of equal length pivoted on pivot pins, gripping members adapted to coact with said pivot pins, means for guiding the gripping members substantially in the directions of the lines bisecting the angles of the linkage, means for enabling at least three of the pivot pins to move substantially at right angles to the directions of movement of said gripping members and means for varying the distance of the gripping members from the pivot pins.

7. A clamping device whereby a substantial equalization of the pressure exerted by the gripping members is effected, comprising a closed linkage having at least four links of equal length pivoted on pivot pins, gripping members adapted to coact with said pivot pins, means for guiding the gripping members substantially in the directions of the lines bisecting the angles of the linkage, means for enabling at least three of the pivot pins to move substantially at right angles to the directions of movement of said gripping members and wedges which are adapted to be inserted between said gripping members and said pivot pins.

8. A clamping device whereby a substantial equalization of the pressure exerted by the gripping members is effected, comprising a closed linkage having at least four links of equal length pivoted on pivot pins, gripping members adapted to coact with said pivot pins, means for guiding the gripping members substantially in the directions of the lines bisecting the angles of the linkage, means for enabling at least three of the pivot pins to move substantially at right angles to the directions of movement of said gripping members, wedges which are adapted to be inserted between said gripping members and said pivot pins and means whereby all of said wedges can be moved simultaneously.

9. A clamping device whereby a substantial equalization of the pressure exerted by the gripping members is effected, comprising a closed linkage having at least four links of equal length pivoted on pivot pins, gripping members adapted to coact with said pivot pins, means for guiding the gripping members substantially in the directions of the lines bisecting the angles of the linkage, means for enabling at least three of the pivot pins to move substantially at right angles to the directions of movement of said gripping members, wedges which are adapted to be inserted between said gripping members and said pivot pins and a ring linked to said wedges whereby all of said wedges can be moved simultaneously.

10. A clamping device comprising a closed linkage having at least four links of equal length pivoted on pivot pins, gripping members adapted to coact with said pivot pins, shoes connected to at least three of the pivot pins, roller bearings interposed between said shoes and said gripping members for enabling the pins to move transversely to the gripping members, means for guiding the gripping members substantially in the directions of the lines bisecting the angles of the linkage, wedges adapted to be inserted between said gripping members and said pivot pins, and means for inserting said wedges.

11. A clamping device comprising a closed linkage having at least four links of equal length pivoted on pivot pins, gripping members adapted to coact with said pivot pins, shoes connected to at least three of the pivot pins, roller bearings interposed between said shoes and said gripping members for enabling the pins to move transversely to the gripping members, means for guiding the gripping members substantially in the directions of the lines bisecting the angles of the linkage, springs attached to said gripping members adapted to draw the gripping members inwards in the guides, stops for arresting the inward movement of at least three of said gripping members, wedges adapted to be inserted between said gripping members and said pivot pins, and a ring linked to said wedges whereby all said wedges can be moved simultaneously.

12. A clamping device whereby a substantial equalization of the pressure exerted by the gripping members is effected, comprising a closed linkage having at least four extensible links pivoted on pivot pins, gripping members adapted to coact with said pivot pins, means for guiding the gripping members substantially in the directions of the lines bisecting the angles of the linkage, means for enabling at least three of the pivot pins to move substantially at right angles to the directions of movement of said gripping members and means whereby the distance apart of the pivot pins can be varied.

13. A clamping device whereby a substantial equalization of the pressure exerted by the gripping members is effected, comprising a closed linkage having at least four extensible links pivoted on pivot pins, gripping members adapted to coact with said pivot pins, means for guiding the gripping members substantially in the directions of the lines bisecting the angles of the linkage, means for enabling at least three of the pivot pins to move substantially at right angles to the directions of movement of said gripping members and means whereby the said pivot pins can be separated.

14. A clamping device whereby a substantial equalization of the pressure exerted by the gripping members is effected, comprising a closed linkage having at least four extensible links pivoted on pivot pins, gripping members adapted to coact with said pivot pins, means for guiding the gripping members substantially in the directions of the lines bisecting the angles of the linkage, means for enabling at least three of the pivot pins to move substantially at right angles to the directions of movement of said gripping members and means operated by a common controlling member whereby the said pivot pins can be separated.

15. A clamping device comprising a closed linkage having at least four links pivoted on pivot pins, each of said links being itself constituted by a second closed linkage, gripping members adapted to coact with said pivot pins, means for guiding the gripping members substantially in the directions of the lines bisecting the angles of the linkage, means for enabling at least three of the pivot pins to move transversely to the direction of movement of said gripping members, and means for separating the pivot pins with which the gripping members coact.

16. A clamping device comprising a closed linkage having at least four links pivoted on pivot pins, each of said links being itself constituted by a second closed linkage, gripping members adapted to coact with said pivot pins, means for guiding the gripping members substantially in the directions of the lines bisecting the angles of the linkage, means for enabling at least three of the pivot pins to move transversely to the direction of movement of said gripping members, and a threaded member coacting with two of the pivots of said second linkage by the operation of which the distance apart of the pivot pins of the first linkage can be varied.

17. A clamping device comprising a closed linkage having at least four links pivoted on pivot pins, gripping means connected to levers which can turn about fixed pivots and thereby guided so as to be movable approximately in the directions of the lines bisecting the angles of the linkage, means for enabling at least three of the pivot pins to move transversely to the direction of movement of said gripping members, and means for moving said gripping members in said directions.

18. A clamping device as claimed in claim 1, wherein the gripping members are in the form of levers which are fulcrumed near one end on the pivot pins.

19. A clamping device whereby a substantial equalization of the pressure exerted by the gripping members is effected, comprising a closed linkage having at least four links of equal length pivoted on pivot pins, gripping members adapted to coact with said pivot pins, means for guiding the gripping members substantially in the directions of the lines bisecting the angles of the linkage, means for enabling at least three of the pivot pins to move substantially at right angles to the directions of movement of said gripping members, wedges which are adapted to be inserted between said gripping members and said pivot pins and means operated by the working movement whereby all of said wedges can be moved simultaneously.

20. A clamping device whereby a substantial equalization of the pressure exerted by the gripping members is effected, comprising a closed linkage having at least four links of equal length pivoted on pivot pins, gripping members adapted to coact with said pivot pins, means for guiding the gripping members substantially in the directions of the lines bisecting the angles of the linkage, means for enabling at least three of the pivot pins to move substantially at right angles to the directions of movement of said gripping members, wedges which are adapted to be inserted between said gripping members and said pivot pins, a ring linked to said wedges whereby all of said wedges can be moved simultaneously, a second ring surrounding said first ring, means for frictionally engaging said rings, and means for arresting said second ring.

21. A clamping device whereby a substantial equalization of the pressure exerted by the gripping members is effected, comprising a closed linkage having at least four links pivoted on pivot pins, gripping members adapted to coact with the said pivot pins, means for guiding the gripping members substantially in the directions of the lines bisecting the angles of the linkage, means for enabling at least three of the pivot pins to move substantially at right angles to the directions of movement of said gripping members, means operated through the agency of the working movement whereby all the said gripping members are simultaneously moved in said former directions.

22. A clamping device comprising a closed linkage having four equal links pivoted on pivot pins, angle shaped gripping members, one limb of each of which is adapted to coact with said pivot pins, shoes connected to at least three of the pivot pins, roller bearings interposed between said shoes and said limbs of the gripping members, means for guiding the other limbs of the gripping members in the diagonal directions of the linkage, springs attached to said limbs adapted to draw the gripping members enclosed in said guides, stops for arresting the inward movement of at least three of said gripping members, wedges adapted to be inserted between said first limbs of said gripping members and said pivot pins, a ring linked to said wedges whereby all of them can be simultaneously moved, and a second ring surrounding said first ring and in frictional engagement therewith, and means for arresting said second ring.

ALFONS PACHTA.